(12) United States Patent
Lemasson et al.

(10) Patent No.: US 7,713,647 B2
(45) Date of Patent: May 11, 2010

(54) SEAL AND FUEL CELL COMPRISING SAME AFFIXED ON THE BIPOLAR PLATES

(75) Inventors: Damien Lemasson, Villeurbanne (FR); Xavier Glipa, Verneuil sur Seine (FR); Francis Roy, Les Ulis (FR); Jean-Philippe Poirot-Crouvezier, Saint Georges de Commiers (FR); Patrick Le Gallo, Saint Appolinard (FR)

(73) Assignees: Peugeot Citroen Automobiles SA, Velizy Villacoublay (FR); Commissariat a l'Energie Atomique, Paris (FR)

( * ) Notice: Subject to any disclaimer, the term of this patent is extended or adjusted under 35 U.S.C. 154(b) by 50 days.

(21) Appl. No.: 11/993,846

(22) PCT Filed: Jun. 23, 2006

(86) PCT No.: PCT/FR2006/001458

§ 371 (c)(1),
(2), (4) Date: Jan. 22, 2008

(87) PCT Pub. No.: WO2007/003742

PCT Pub. Date: Jan. 11, 2007

(65) Prior Publication Data

US 2008/0268324 A1    Oct. 30, 2008

(30) Foreign Application Priority Data

Jun. 28, 2005   (FR) ................... 05 06558

(51) Int. Cl.
*H01M 2/08* (2006.01)
(52) U.S. Cl. ................ 429/36; 429/35; 429/34
(58) Field of Classification Search .................. 429/36
See application file for complete search history.

(56) References Cited

U.S. PATENT DOCUMENTS

| | | | | |
|---|---|---|---|---|
| 5,464,700 A | * | 11/1995 | Steck et al. | 429/30 |
| 2002/0051902 A1 | * | 5/2002 | Suenaga et al. | 429/35 |
| 2003/0091885 A1 | | 5/2003 | Kobayashi et al. | |
| 2003/0194597 A1 | * | 10/2003 | Ganski et al. | 429/38 |
| 2005/0095490 A1 | | 5/2005 | Mittelstadt et al. | |

FOREIGN PATENT DOCUMENTS

| | | |
|---|---|---|
| JP | 05242897 A | 9/1993 |
| JP | 06325777 A | 11/1994 |
| WO | WO 9222096 A | 12/1992 |

OTHER PUBLICATIONS

International Search Report mailed Jan. 22, 2007 in PCT/FR2006/001458.

\* cited by examiner

*Primary Examiner*—Patrick Ryan
*Assistant Examiner*—Brent Thomas
(74) *Attorney, Agent, or Firm*—Nicolas E. Seckel

(57) ABSTRACT

The invention mainly concerns a fuel cell seal (52) designed to be affixed on a bipolar plate (22) in the form of a membrane whereof the profile corresponds approximately to the peripheral frame (50) of the bipolar plate (22) and comprising a central opening (66) coinciding approximately with the central zone (46) dispensing the reagents of the bipolar plate (22). The invention also concerns a fuel cell comprising an electrode membrane assembly (70) which includes in particular an active region (74), which is the site of anode and cathode reactions, and a peripheral frame (75) and which is sandwiched between two bipolar plates (22) whereon is affixed the inventive seal (52).

17 Claims, 4 Drawing Sheets

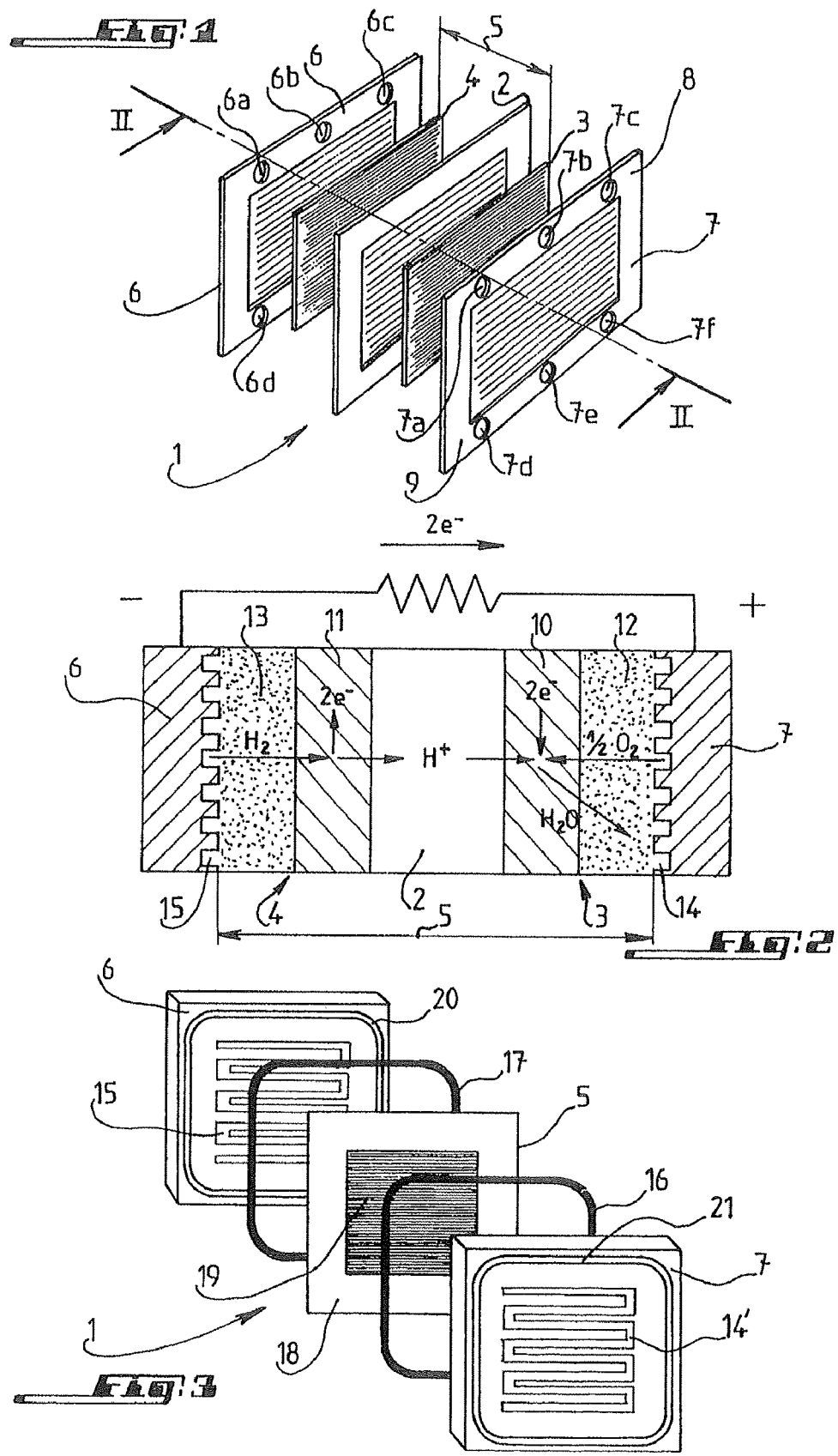

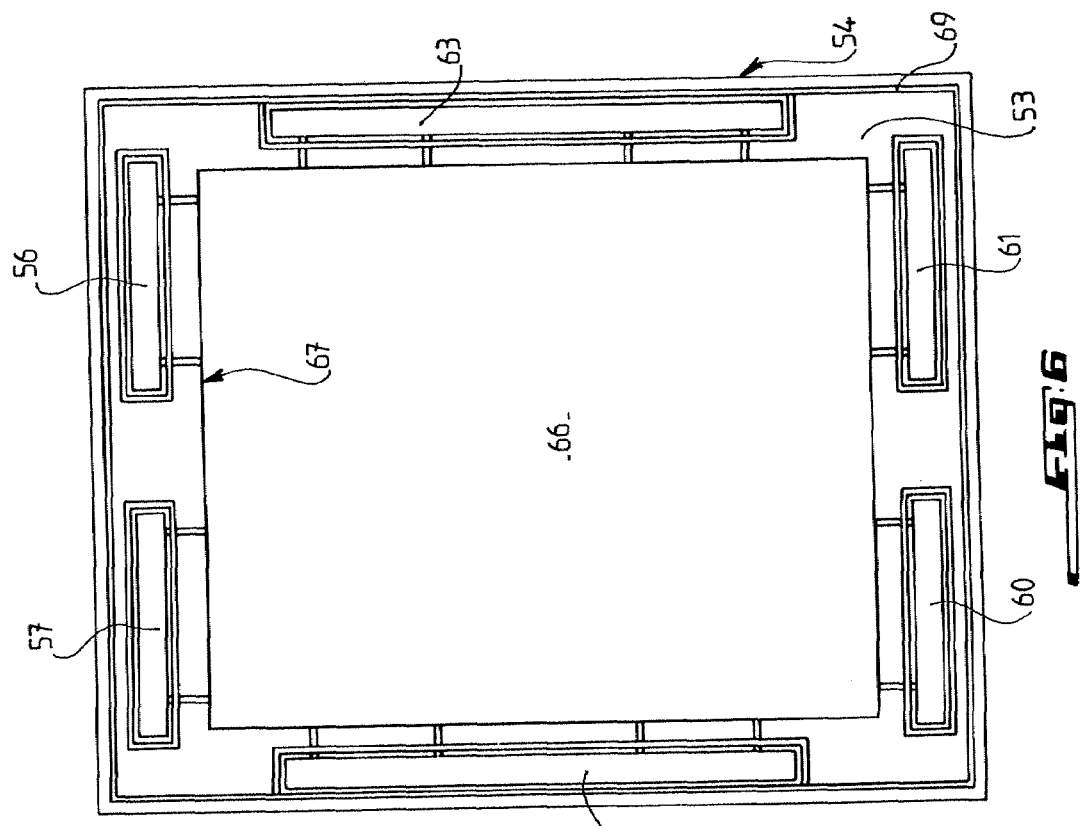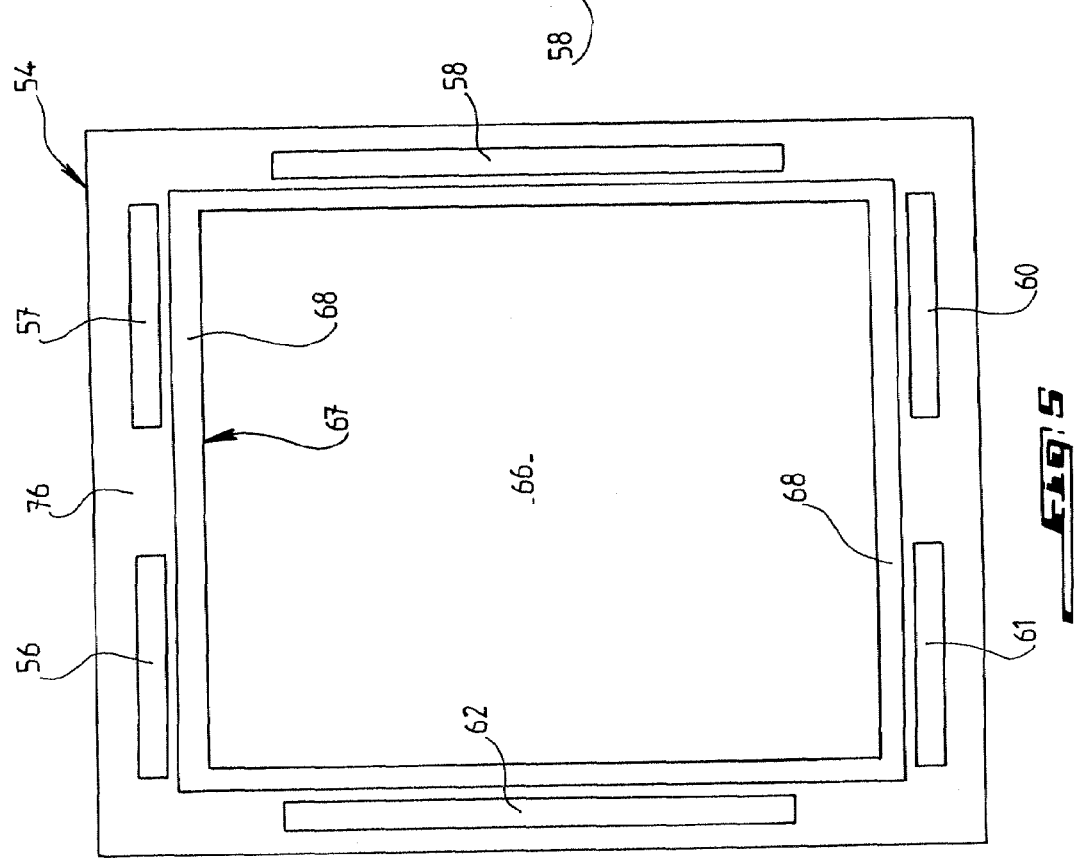

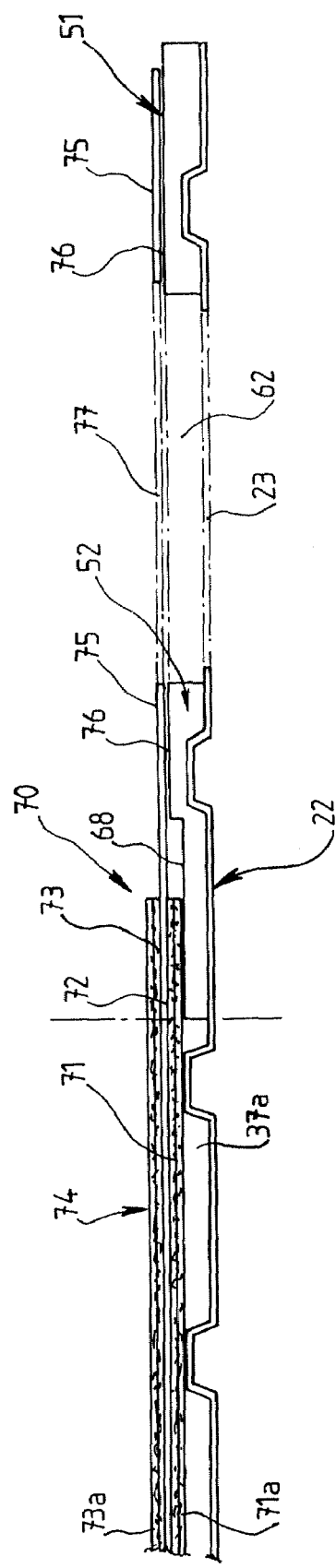

SEAL AND FUEL CELL COMPRISING SAME AFFIXED ON THE BIPOLAR PLATES

Figure 4:
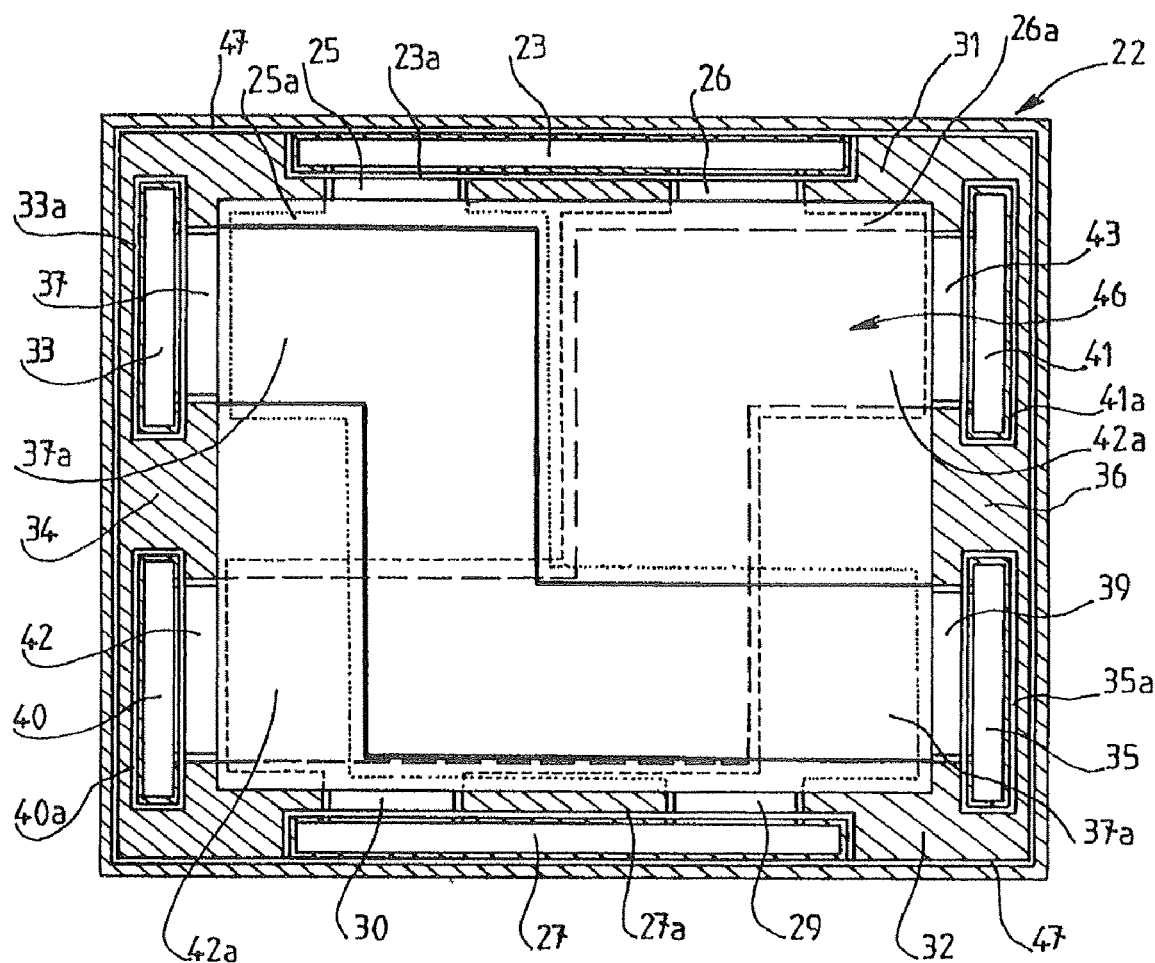

The invention mainly concerns a fuel cell seal.

The invention concerns a cell of fuel cell stack comprising a bipolar plate on which such a seal is affixed.

A fuel cell is an electrochemical device that makes it possible to convert chemical energy to electrical energy from a fuel (generally hydrogen) and an oxidant (oxygen or an oxygen-containing gas such as air); the only product of the reaction is water, accompanied by a release of heat and generation of electricity.

Inside the fuel cell, the overall chemical reaction produced by the reactions that take place at the electrodes is the following:

$$H_2 + \tfrac{1}{2}O_2 \rightarrow H_2O$$

A fuel cell can be used to supply electrical energy to any device, such as a computer or a cellular phone, for example, but it can also be used to power a motor vehicle and/or the electrical devices contained in a vehicle.

A fuel cell stack can be made up of one or more cells.

Referring to FIG. 1, which represents a cell of a prior art fuel cell stack, such a cell 1 has a proton-conducting electrolyte 2, sandwiched between a cathode porous electrode 3 and an anode porous electrode 4, that ensures the proton transfer between these two electrodes 3, 4.

To this end, the electrolyte 2 can be a proton-exchanging polymer membrane 20 to 200 μm thick, the resulting fuel cell being a PEMFC-type cell (Proton Exchange Membrane Fuel Cell).

The assembly consisting of the electrolyte 2 and the two electrodes 3, 4 forms a membrane electrode assembly (MEA) 5 that is itself sandwiched between first 6 and second 7 bipolar plates that collect the current, distribute the oxidant and the fuel to the electrodes and circulate the heat transfer fluid.

The bipolar plates 6, 7 commonly used are made of materials that have good corrosion resistance and electrical conductivity properties, such as carbon materials like graphite, polymer-impregnated graphite, or flexible graphite sheets fabricated by machining or molding them.

The bipolar plates 6, 7 can also be made using metal materials such as titanium-, aluminum- and iron-based alloys, including stainless steels. In this case, the bipolar plate can be fabricated by drawing or stamping thin sheets.

In order to distribute the oxidant, the fuel, and the heat transfer fluid to all of the constituent cells of the stack, the second bipolar plate 7 has six drilled holes 7a, 7b, 7c, 7d, 7e, 7f, three of which 7a, 7b, 7c are evenly spaced on the top edge 8 of this plate 7, with the three other holes 7d, 7e, 7f evenly spaced as well in a symmetrical manner on the bottom edge 9 of this plate 7.

The first bipolar plate 6 has the same holes located in the same places as those on the bipolar plate 7, with FIG. 1 showing only the three top holes 6a, 6b, 6c and one bottom hole 6d.

The holes 6a, 6b, 6c, 6d in the first bipolar plate 6 and the holes 7a, 7b, 7c, 7d, 7e, 7f in the second bipolar plate 7 must be aligned so that the fluids can circulate through all the constituent cells of the stack when this stack is assembled.

At each of these holes 7a, 7b, 7c, 7d, 7e, 7f, 6a, 6b, 6c, 6d, a conduit that is not shown makes it possible to supply or recover the heat transfer fluid, the fuel or the oxidant circulating on the surface of the plate 6, 7 or inside the plate 6, 7 in fluid circulation circuits or channels provided for this purpose, which will be described below.

Referring to FIG. 2, which is a section along the line II-II in FIG. 1, the cathode 3 and anode 4 electrodes each have a respective active layer 10, 11, which are the cathode and anode reaction sites, respectively, and a respective diffusion layer 12, 13 sandwiched between the active layer 10, 11 and the corresponding bipolar plate 7, 6; this diffusion layer 12, 13 can be a paper substrate or a carbon cloth.

The diffusion layer 12, 13 homogeneously diffuses reagents such as hydrogen and oxygen, which circulate in their respective channels 14, 15, formed by grooves in the respective bipolar plates 7, 6.

In this way, the active layer 11 of the anode electrode 4 is supplied with hydrogen via the diffusion layer 13, and the reaction that occurs at this active layer in 11 is the following:

$$H_2 \rightarrow 2e^- + 2H^+ \quad (1)$$

In the same way, the active layer 10 of the cathode electrode 3 is supplied with oxygen via the diffusion layer 12, and the reaction that occurs in this active layer 10 is the following:

$$\tfrac{1}{2}O_2 + 2H^+ 2e^- \rightarrow H_2O \quad (2)$$

These reactions are made possible by the presence of the conductive membrane 2, through which protons are transferred from the active layer 11 of the anode 4 toward the active layer 10 of the cathode 3.

Due to the nature of the fluids used and the electrochemical reactions involved, sealing is an important consideration in the design of a fuel cell.

Referring to FIG. 3, which represents a cell of a prior art fuel cell stack, this seal can be formed by the presence of a gasket that is circular in cross-section 16, 17 interposed between the respective bipolar plates 6, 7 and the membrane electrode assembly 5, made up of an active area 19 where the electrochemical reactions take place and a frame 18 surrounding this active area 19.

Referring to the anode part of the cell 1 shown in this figure, when the fuel cell is assembled, the gasket 17 is fitted into a conjugate peripheral groove 20 in the bipolar plate 6 that surrounds the reagent distribution channels 15.

During this same assembly process, the frame 18 of the assembly 5 is made to bear on the whole periphery of the bipolar plate 6 and compresses the corresponding gasket 16, which thereby allows the seal to form between the anode part and the exterior of the fuel cell.

Naturally, in a symmetrical fashion, the bipolar plate 7 in the cathode part of the cell 1 also has a peripheral groove surrounding the oxidant distribution channels of this plate 7 into which the gasket 16 fits; they are neither shown nor referenced due to the angle from which this figure is seen. Thus it is understood that the groove 21 and the distribution channels 14' of the bipolar plate 7 that are referenced and depicted belong to the anode part of the cell next to the cell 1.

It is also possible to design the groove 20 and its corresponding groove in the bipolar plate of the cathode part so that they are circular in shape, and in this case, the gasket 16 used is an O-ring.

According to prior art, the gasket 16 can also be a flat or serigraphed seal, and in this case, the parts of the cell, particularly the bipolar plates 6, 7 have a shape modified to fit.

It is also possible to have the gasket positioned on the membrane electrode assembly 5 rather than being positioned on the bipolar plate before assembly; in this case as well, the parts that make up the cell are appropriately modified.

In the prior art device shown in FIG. 3, the seal may not be optimally formed, due in particular to flattening of the gasket 17 in the groove 20.

In this context, the invention particularly concerns a seal that makes it possible to overcome the disadvantages cited above.

To this end, the seal 52 of the invention is essentially characterized in that it is in the form of a membrane whose profile corresponds approximately to that of the peripheral frame 50 of the bipolar plate, and in that it has a central opening 66 matching up approximately with the central surface 46 of reagent distribution on the bipolar plate 22.

By preference, the seal has a rabbet 68 at the inner rim framing the central opening 67 on which the anode or cathode diffusion layer 71a, 73a of the active area 74—the anode and cathode reaction sites—of a membrane electrode assembly 70 at least partly bears when the fuel cell stack is assembled, while it also bears on the bipolar plate 22 at its central area 46, and in that it also has a front face 76 on which a peripheral frame 75 of the assembly 70 is made to bear without excessive deformation when the fuel cell is assembled.

Advantageously, the face 53 of the seal that is in contact with the bipolar plate has at least one recess 69 that matches up with a raised peripheral border 47 surrounding at least the central area 46 of the bipolar plate 22, which border is formed on the bipolar plate 22 so as to fit into the recess 69 of the seal 52 when the fuel cell stack is assembled.

In addition, this face in contact with the bipolar plate 53 can have at least one recess 69 coinciding with at least one raised peripheral border 33a, 35a, 40a, 41a, 23a, 24a, 27a, 28a arranged around at least one respective opening 33, 35, 40, 41, 23, 24, 27, 28 in the bipolar plate, respectively forming inlet means for heat transfer fluid 23, oxidant 33, and fuel 40 and outlet means for heat transfer fluid 27, oxidant 35, and fuel 41.

The seal is preferably made of polyetheretherketone, polytetrafluoroethylene, viton or silicone, optionally reinforced and/or loaded.

Advantageously, the seal is molded or injected so as to make the recesses 69 match up with the raised borders 47, 33a, 35a, 40a, 41a, 23a, 24a, 27a, 28a of the bipolar plate 22.

The invention also concerns a cell of a fuel cell stack that includes a membrane electrode assembly 70 that has an active area 74 in particular—the anode and cathode reaction sites— and a peripheral frame 75, said assembly being sandwiched between two bipolar plates 22 on which the above-defined seal is affixed.

By preference, an anode or cathode diffusion layer 71a, 73a of the membrane electrode assembly 70 bears on the central reagent distribution area 46 of the bipolar plate, and at least partly on the rabbet 68 of the seal 52, and the peripheral frame 75 of the membrane electrode assembly 70 bears on the front face 76 of the seal 52, being positioned relative to this membrane electrode assembly 70 and the seal 52 so as not to cause excessive deformation when the fuel cell stack is being assembled and tightened.

In addition, the peripheral frame 76 of the membrane electrode assembly 70 can have openings 77 corresponding to each of the respective openings in the bipolar plate 33, 35, 40, 41, 23, 24, 27, 28, and the seal 61, 57, 60, 56, 62, 63, 58, 59, so that the openings in the peripheral frame 77, the seal 61, 57, 60, 56, 62, 63, 58, 59 and the bipolar plate 33, 35, 40, 41, 23, 24, 27, 28 match up when the fuel cell stack is being assembled, and so that the peripheral frame 76 bears on the whole surface of the front face 76 of the seal 52.

By preference, the seal 52 is removably installed, glued or overmoulded onto the bipolar plate 22.

Lastly, the invention also concerns a fuel cell stack comprising at least one above-defined cell.

The invention will be more easily understood, and other purposes, advantages, and characteristics thereof will become clearer in the following description, written with reference to the attached drawings, which represent non-limiting examples embodying the device of the invention, and in which:

FIG. 1 is a perspective exploded view of a prior art fuel cell;
FIG. 2 is a sectional view along the line II-II in FIG. 1;
FIG. 3 is a perspective exploded view of a prior art fuel cell;
FIG. 4 is a front view of the bipolar plate;
FIG. 5 is a front view of the upper face of the seal of the invention;
FIG. 6 is a front view of the lower face of the seal of the invention;
FIG. 7 is a sectional view of the upper part of the bipolar plate which has the inventive seal and which is assembled with the membrane electrode assembly.

Referring to FIG. 4, the bipolar plate 22 of the invention is rectangular in shape.

The plate 22 has an inlet window for heat transfer fluid 23 that runs lengthwise at the periphery of the plate 22 along a first longitudinal edge 31, and from which two heat transfer fluid inlet channels 25, 26 formed in the plate 22 extend from the inlet window 23 to the periphery of a rectangular central surface 46, where they enter the plate 22.

These channels 25, 26 introduce the heat transfer fluid into the plate 22 from the inlet window 23; the heat transfer fluid thus introduced circulates within the thickness of the plate at the central surface 46 in distribution channels that are shown schematically and referenced 26a and 25a.

The bipolar plate 22 also has a heat transfer fluid outlet window 27 that runs lengthwise at the periphery of the plate 22 along the second, opposite longitudinal edge 32, from which window two heat transfer fluid outlet channels 29, 30 formed in the plate 22 extend from the rectangular central surface 46 to the window 27, thereby allowing the heat transfer fluid to be collected after circulating in the heat transfer fluid distribution channels 25a, 26a.

When the stack is assembled, the heat transfer fluid inlet 23 and outlet 27 windows in all of the cells that make up the stack are superimposed, forming a heat transfer fluid circuit consisting of a supply circuit and an exhaust circuit for heat transfer fluid.

The plate 22 also has an oxidant inlet window 33 located at the periphery of the plate 22, running transversely along a first half of a first transverse edge 34 of the plate 22, and an oxidant outlet window 35 located at the periphery of the plate 22, running transversely along one half of the second, opposite transverse edge 36, substantially on a diagonal relative to the oxidant inlet window 33.

An oxidant inlet channel 37 is formed in the plate 22 and runs from the oxidant inlet window 33 toward the rectangular central surface 46 so that the oxidant diffuses from this inlet channel 37 toward and up to an oxidant distribution channel 37a formed in the bipolar plate 22 at the rectangular central surface 46, which channel is open on top in order to diffuse into the cathode electrode of a membrane electrode assembly not shown in this figure, which is intended to bear on the bipolar plate, more particularly, at the central area 46, as will be described below.

An oxidant outlet channel 39 is formed in the plate 22 and runs from the oxidant outlet window 35 toward the central surface 46 so that the oxidant diffuses from the distribution channel 37a through the outlet channel 39 toward the outlet window 35.

When the stack is assembled, the stacking of the windows 33 and 35 of all the cells that constitute the stack forms a fluid circuit that transports the oxidant, composed of an oxidant supply circuit and exhaust circuit.

In symmetrical fashion, the bipolar plate 22 also has a fuel inlet window 40 running transversely along the second half of the first transverse edge 34, and a fuel outlet window 41 running transversely along one half of the second transverse edge 36, placed substantially on a diagonal relative to the inlet window 40.

The bipolar plate 22 also has a fuel inlet channel 42 and a fuel outlet channel 43 running from the respective fuel inlet 40 and outlet 41 windows toward the central surface 46.

The fuel thus circulates from the inlet window 40 to the outlet window 41 through a fuel distribution channel 42*a* formed in the bipolar plate 22, this distribution channel 42*a* being open on the bottom in order to diffuse into the cathode electrode of a membrane electrode assembly not shown in this figure, which is intended to bear on the underside of the bipolar plate.

When the stack is assembled, the stacking of the windows 40 and 41 of all the constituent cells of the stack forms a fluid circuit that transports the fuel, composed of a fuel supply circuit and exhaust circuit.

Of course, the arrangement of the oxidant outlet and inlet windows can be reversed, e.g., so that the oxidant inlet 33 and outlet 35 windows as well as the fuel inlet 40 and outlet 41 windows are respectively facing one another rather than on the diagonal.

Referring to FIG. 4, the bipolar plate 22 has a peripheral raised border 47 located along the whole periphery of the plate 22, enclosing the heat transfer fluid inlet window 23, the oxidant inlet window 33, the fuel inlet window 40, the heat transfer fluid outlet window 27, the oxidant outlet window 35, the fuel outlet window 41, and the rectangular central surface 46 of the bipolar plate 22.

This raised border makes it possible to seal off the inside of the assembled stack from the outside of this stack.

In addition, the heat transfer fluid inlet window 23, the oxidant inlet window 33, the fuel inlet window 40, the heat transfer fluid outlet window 27, the oxidant outlet window 35, and the fuel outlet window 41 each have a respective raised border 23*a*, 33*a*, 35*a*, 27*a*, 40*a*, 41*a* that seals off each of these windows 23, 33, 40, 27, 35, 41 when the stack is assembled, as will be described below.

At the heat transfer fluid inlet 23 and outlet 27 windows, the outermost part of the respective raised border 23*a*, 27*a* overlaps with the peripheral raised border 47 of the plate 22, whereas at the inlet 33, 40 and outlet 35, 41 windows for oxidant and fuel, respectively, the peripheral border 47 of the bipolar plate 22 encloses each window 33, 40, 41, 35 along with its corresponding raised border 33*a*, 40*a*, 41*a*, 35*a*.

The peripheral border 47 of the bipolar plate 22, as well as the respective borders 23*a*, 33*a*, 40*a*, 27*a*, 35*a*, 41*a* of the heat transfer fluid inlet window 23, the oxidant inlet window 33, the fuel inlet window 40, the heat transfer fluid outlet window 27, the oxidant outlet window 35, and the fuel outlet window 41 can be formed by drawing or stamping them, and they have a flat front face 48 parallel to the plane of the bipolar plate 22, being connected thereto by right-angle or oblique edges 49.

Referring to FIG. 5, the upper face 51 of the seal 52 of the invention is smooth, and is profiled like the peripheral frame 50 of the bipolar plate 22.

More particularly, the outer contour 54 of the seal 52 is rectangular, and matches up with the rectangular outer contour 55 of the bipolar plate 22.

Also, the seal 52 has six openings 56, 57, 58, 60, 61, 62 in the form of windows that match up with the respective inlet and outlet windows of the bipolar plate 22 for heat transfer fluid 23, 27, oxidant 33, 35 and fuel 40, 41.

The seal 52 also has a substantially rectangular central opening 66 that coincides approximately with the central surface 46 of the bipolar plate so that at least the distribution channel 37*a* of the central surface 46 of the bipolar plate 22 is not covered by the seal 52 when this seal 52 is affixed to the plate 22.

The inner peripheral rim framing the central opening 67 defines a rabbet 68 that receives the diffusion layer of the membrane electrode assembly when the stack is assembled, which will be described below.

The width of the rabbet 68 is such that when the seal 52 is assembled on the bipolar plate 22, this rabbet 68 at least partly covers the inlet channels for heat transfer fluid 25, 26, oxidant 37, and fuel 42, respectively, and the outlet channels for heat transfer fluid 29, 30, oxidant 39 and fuel 43, respectively, from the respective peripheral borders 23*a*, 33*a*, 35*a*, 27*a*, 40*a*, 41*a* of the heat transfer fluid 23, oxidant 33, and fuel 35 inlet windows, and heat transfer fluid 27, oxidant 35, and fuel 41 outlet windows up to the periphery of the central surface 46.

Referring to FIG. 6, the lower face 53 of the seal 52 has the same profile as the upper face 51 but it has recesses 69 formed in the seal that match up with the raised peripheral border 47 of the bipolar plate 22, the raised peripheral borders 23*a*, 27*a*, 33*a*, 35*a*, 40*a*, 41*a*, the raised inlet channels for heat transfer fluid 25, 26, oxidant 37, and fuel 42, and the raised outlet channels for heat transfer fluid 29, 30, oxidant 39, fuel 43, and the current collectors 44*a*, 44*b*, 44*c*, 44*d*, 44*e*, 44*f*, 44*g*, 44*h*, so that this lower face 53 fits into the bipolar plate 22 by matching up with each contour feature of this bipolar plate 22.

When the stack is assembled, the seal 52 is set or glued onto the bipolar plate 22.

This seal 52 is molded so as to have a geometry compatible with the contour features of the bipolar plate 22, as previously explained.

The lower face 53 is therefore the negative of the peripheral frame 50 of the bipolar plate 22 on which it bears when the stack is assembled.

Referring to FIG. 7, when the stack is assembled, the membrane electrode assembly 70, comprising an active area 74 made up of a cathode electrode 71, an electrolyte 72, an anode electrode 73, and anode 73*a* and cathode 71*a* diffusion layers, respectively, as described in reference to prior art, as well as a peripheral frame 75 extending from the electrolyte 72, is made to bear on the bipolar plate 22.

During this assembly, the cathode diffusion layer 71*a* covers the whole central rectangular surface 46 of the bipolar plate 22, as well as at least part of the rabbet 68 of the seal 52.

It is also possible to have the cathode diffusion layer 71*a* of the membrane electrode assembly 70 cover the rabbet 68 completely.

As shown in FIG. 7, the peripheral frame 75 of the membrane electrode assembly 70 bears on the front face 76 of the upper face 51 of the seal 52, and in this way, the active area 74 and each of the respective inlet and outlet windows for heat transfer fluid 23, 27, oxidant 33, 35, and fuel 40, 41 are sealed.

This way, the rabbet 68 both ensures that the membrane electrode assembly 70 is centered and prevents the oxidant from potentially leaking out of the distribution channel 37*a* or the cathode electrode 71 toward the exterior of the cell due to the way the active area 74 and the peripheral frame 75 of the membrane electrode assembly 70 are assembled relative to the bipolar plate 22 together with its seal 52.

That is, in order to form the best seal between the active area 74 and the outside of the stack, the peripheral frame 75 is positioned within the assembly 70 at a height such that this frame 75 bears on the front face 76 of the seal 52 without excessive deformation, which allows this seal to form between the active area 74 of the membrane electrode assembly 70 and the exterior of the cell with no risk of shearing of this peripheral frame 75.

Naturally, the corresponding bipolar plate on the anode side also has a seal identical to the one described above.

During this assembly, the seal 52 deforms elastically in response to the tightening load; this deformation makes it possible to compensate for manufacturing tolerance ranges for all of the components of the stack, while maintaining a sufficient tightening load to ensure the seal.

The deformations generated by this stacking are therefore entirely elastic, and the other components do not need to be plasticized in any way, which advantageously makes it possible to ensure that the stack is repairable by reusing certain parts, such as the bipolar plates on which the seal is mounted.

Also advantageously, fabricating the peripheral frame 5 of the bipolar plate 22 by drawing or stamping it makes this plate stiff enough to transmit a linear load, which is needed for the seal.

The invention claimed is:

1. Fuel cell comprising two bipolar plates and a membrane electrode assembly sandwiched between the bipolar plates,
   each of the bipolar plates having (i) a bipolar plate peripheral frame, and (ii) a central area having channels for reagent distribution, and
   the membrane electrode assembly having (i) a membrane electrode assembly peripheral frame, and (ii) an active central area comprising an anode diffusion layer on one side of the membrane electrode assembly and a cathode diffusion layer on another side of the membrane electrode assembly,
   wherein a seal is interposed between at least one of the bipolar plates and the membrane electrode assembly,
   wherein each seal is in the form of a membrane having (i) a peripheral frame whose profile corresponds approximately to the peripheral frame of the bipolar plate, and (ii) a central opening matching up approximately with the central area of reagent distribution on the bipolar plate,
   wherein the seal has a rabbet at an inner rim of its central opening, said rabbet framing said central opening, so that a respective one of the anode and cathode diffusion layers of the active central area of the membrane electrode assembly at least partly bears on both the rabbet and the bipolar plate at its central area,
   and wherein the peripheral frame of the seal also has a front face on which the peripheral frame of the membrane electrode assembly bears without excessive deformation.

2. Cell according to claim 1, wherein a back face of each seal in contact with the bipolar plate has at least one recess that matches up with a raised peripheral border surrounding at least the central area of this bipolar plate, wherein said border of this bipolar plate fits into the recess of the seal.

3. Cell according to claim 2, wherein the back face of the seal in contact with the bipolar plate has at least one other recess that matches up with at least one other raised peripheral border arranged around at least one of (i) respective inlet openings in this bipolar plate for heat transfer fluid, oxidant, and fuel and (ii) respective outlet openings for heat transfer fluid, oxidant, and fuel.

4. Cell according to claim 1, which is made of polyetheretherketone, polytetrafluoroethylene, fluoroelastomer or silicone, optionally reinforced and/or loaded.

5. Seal-Cell according to claim 1, wherein the seal is molded or injected.

6. Cell according to claim 1, wherein the peripheral frame of the membrane electrode assembly has openings corresponding to each of respective openings in the bipolar plates and in the seal so that the openings in the peripheral frame, the seal and the bipolar plate match up, and so that the peripheral frame of the membrane electrode assembly bears on the whole surface of the front face of the seal.

7. Cell according to claim 1, wherein the seal is removably installed onto the bipolar plate.

8. Cell according to claim 1, wherein the seal is glued onto the bipolar plate.

9. Cell according to claim 1, wherein the seal is overmoulded onto the bipolar plate.

10. Cell according to claim 2, which is made of polyetheretherketone, polytetrafluoroethylene, fluoroelastomer or silicone, optionally reinforced and/or loaded.

11. Cell according to claim 3, which is made of polyetheretherketone, polytetrafluoroethylene, fluoroelastomer or silicone, optionally reinforced and/or loaded.

12. Cell according to claim 2, wherein the seal is molded or injected.

13. Cell according to claim 3, wherein the seal is molded or injected.

14. Cell according to claim 2, wherein the peripheral frame of the membrane electrode assembly has openings corresponding to each of respective openings in the bipolar plates and in the seal so that the openings in the peripheral frame, the seal and the bipolar plate match up, and so that the peripheral frame of the membrane electrode assembly bears on the whole surface of the front face of the seal.

15. Cell according to claim 3, wherein the peripheral frame of the membrane electrode assembly has openings corresponding to each of respective openings in the bipolar plates and in the seal so that the openings in the peripheral frame, the seal and the bipolar plate match up, and so that the peripheral frame of the membrane electrode assembly bears on the whole surface of the front face of the seal.

16. Cell according to claim 4, wherein the peripheral frame of the membrane electrode assembly has openings corresponding to each of respective openings in the bipolar plates and in the seal so that the openings in the peripheral frame, the seal and the bipolar plate match up, and so that the peripheral frame of the membrane electrode assembly bears on the whole surface of the front face of the seal.

17. Cell according to claim 5, wherein the peripheral frame of the membrane electrode assembly has openings corresponding to each of respective openings in the bipolar plates and in the seal so that the openings in the peripheral frame, the seal and the bipolar plate match up, and so that the peripheral frame of the membrane electrode assembly bears on the whole surface of the front face of the seal.

* * * * *